United States Patent [19]
Jensen

[11] Patent Number: 5,362,094
[45] Date of Patent: Nov. 8, 1994

[54] HYDRAULICALLY CONTROLLED STABILIZER BAR SYSTEM

[75] Inventor: Eric L. Jensen, Dayton, Ohio

[73] Assignee: General Motors Corporation, Detroit, Mich.

[21] Appl. No.: 74,194

[22] Filed: Jun. 9, 1993

[51] Int. Cl.⁵ ............................................. B60G 21/055
[52] U.S. Cl. .................................... 280/689; 280/723; 280/772
[58] Field of Search .................... 280/689, 723, 772

[56] References Cited

U.S. PATENT DOCUMENTS

| | | | |
|---|---|---|---|
| 4,168,075 | 9/1979 | Matschinsky | 280/6 H |
| 4,796,911 | 1/1989 | Kuroki et al. | 280/689 |
| 4,892,329 | 1/1990 | Kozaki et al. | 280/689 |
| 5,186,486 | 2/1993 | Hynds et al. | 280/689 |

FOREIGN PATENT DOCUMENTS

| | | | |
|---|---|---|---|
| 512358 | 11/1992 | European Pat. Off. | 280/689 |
| 2-24213(A) | 1/1990 | Japan . | |
| 12869 | 8/1992 | WIPO | 280/689 |

*Primary Examiner*—Kenneth R. Rice
*Attorney, Agent, or Firm*—A. Michael Tucker

[57] ABSTRACT

A stabilizer bar system includes a stabilizer bar connected to a support by a hydraulic actuator. A pump forces fluid into conduits connected to upper and lower chambers of the actuator. A check valve is provided between the pump and the actuator. A pressure control valve, provided between the check valve and the actuator, is controlled by an electronic controller to vary pressure in the actuator chambers.

2 Claims, 3 Drawing Sheets

HYDRAULICALLY CONTROLLED STABILIZER BAR SYSTEM

BACKGROUND OF THE INVENTION

1. Field of the Invention

The present invention relates generally to vehicular suspension systems and, in particular, is concerned with a hydraulically controlled stabilizer bar system.

2. Description of the Related Art

A vehicular suspension system typically consists of springs and dampers connecting the wheels to a body. These components support the mass of the vehicle and isolate the unevenness of the road surface from the passengers. The suspension system is also responsible for controlling the relative motion of the body to the wheels when actions such as braking pitch, turning roll and vertical road displacements heave create forces to the body.

For additional resistance to the lateral roll of the body that occurs during turning, a torsional spring known as a stabilizer bar is connected between the left and right corner suspensions of the car body. The stabilizer bar reduces the total roll angle while only moderately increasing the stiffness of the suspension system in heave or pitch directions. A stabilizer bar adds to the comfort of the passengers and improves the lateral stability and handling of the vehicle, and can be applied to either the front or the rear of the vehicle. When smaller roll angles and better handling are desired for a sporting type vehicle, the stiffness of the stabilizer bar can be increased such that the ride is significantly affected as a trade-off for handling.

Many stabilizer bars are U-shaped members having a central, transversely-mounted section and a pair of longitudinally-projecting arms connected to respective wheel supports, usually a control arm pivotally connected to a chassis rail. Oftentimes, either a rigid or flexible end link is connected between a control arm and a stabilizer bar. When the control arm moves as a result of a road input, the end link transmits all or part of the movement to the stabilizer bar. The spring effect of the stabilizer bar is then transmitted through an opposite end link to a control arm on the other side of the vehicle to resist the rolling motion of the vehicle.

The art continues to seek improvements. It is desirable to provide a stabilizer bar system having controllable hydraulic actuator connecting a stabilizer bar to a support to vary the roll resistance provided by the system.

SUMMARY OF THE INVENTION

The present invention includes a hydraulic actuator connecting a stabilizer bar to a pivotable control arm. A pressure control valve provides a controllable fluid conduit which is adjusted to road conditions. An electronic controller can receive sensor inputs vehicle roll, speed, steering, etc. and adjust the length or resistance to movement of the present actuator to produce a desired ride and handling level. The present system is suitable for use with conventional stabilizer bars and control arms.

In a preferred embodiment, a stabilizer bar system includes a stabilizer bar connected to a support by a hydraulic actuator. A pump forces fluid into conduits connected to upper and lower chambers of the actuator. A check valve is provided between the pump and the actuator. A pressure control valve, provided between the check valve and the actuator, is controlled by an electronic controller to vary pressure in the actuator chambers.

DETAILED DESCRIPTION OF THE PREFERRED EMBODIMENT

Figure 1:
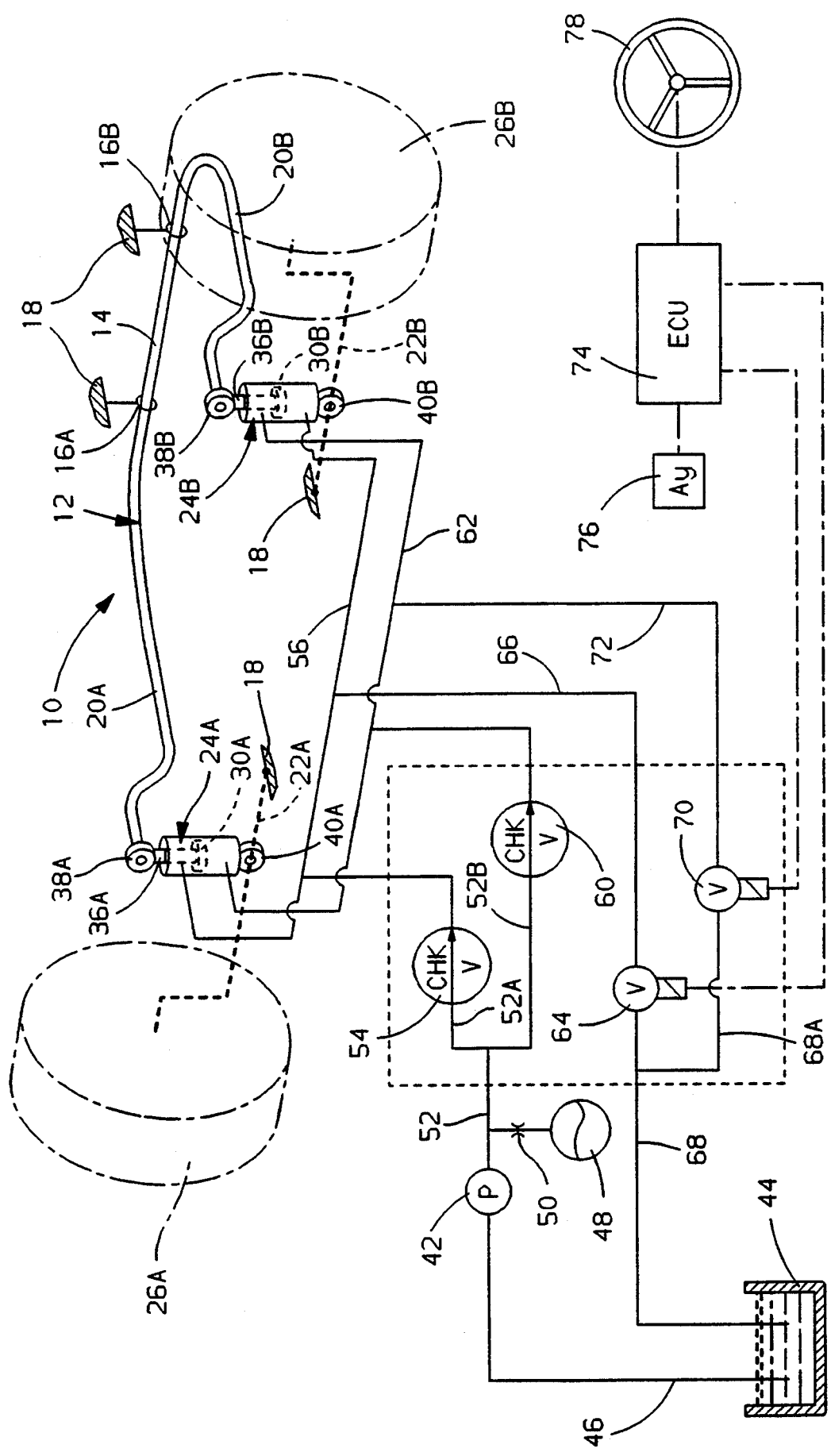
FIG. 1 is a schematic representation of a first embodiment of a stabilizer bar system according to the present invention incorporating a hydraulic actuator connected between each end of a stabilizer bar and a respective control arm.

A stabilizer bar system indicated generally at 10 is schematically illustrated in FIG. 1. A stabilizer bar 12 includes a central cylindrical portion 14 transversely mounted with respect to a longitudinal axis of a vehicle by brackets 16A, 16B to a vehicle chassis 18. Forward projecting arms 20A, 20B of the stabilizer bar 12 are connected to control arms 22A, 22B via respective hydraulic actuators 24A, 24B which are discussed in detail below. Each control arm 22A, 22B is pivotally connected at its inboard end to the chassis 18, typically to a longitudinal rail. At its outboard end, each control arm 22A, 22B supports a wheel assembly 26A, 26B. In this manner, each wheel assembly 26A, 26B receives road inputs and pivots with respect to the chassis 18 via a control arm 22A, 22B. The stabilizer bar 12 transfers an input at one wheel assembly to the opposite wheel assembly to resist roll of a vehicular body not illustrated.

Figure 2:
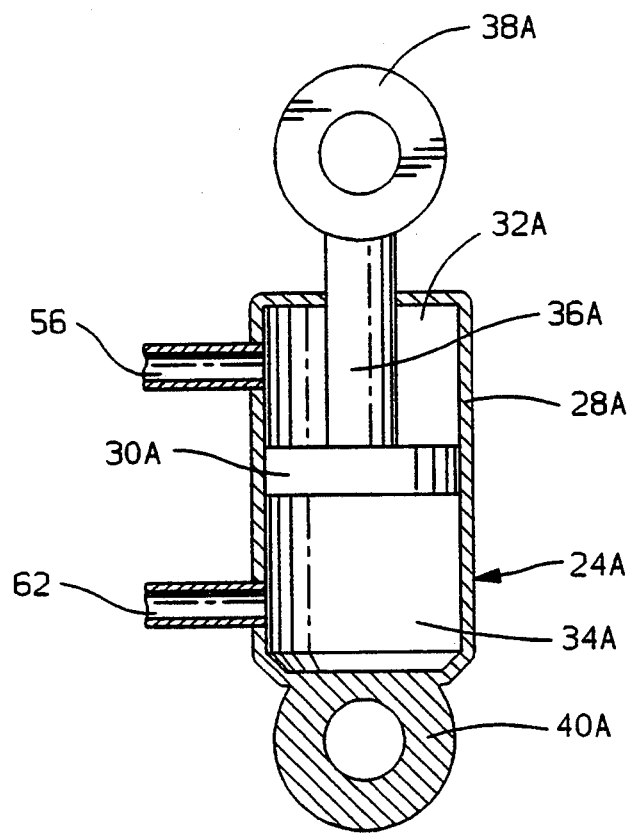
FIG. 2 is an enlarged, schematic sectional view of one of the hydraulic actuators of FIG. 1.

Each hydraulic actuator 24A, 24B is identical in construction. For convenience, actuator 24A is illustrated in detail in FIG. 2. Like elements of actuator 24B are labeled with the same reference numeral as the corresponding element of actuator 24A, except that "B" is substituted for "A". Actuator 24A is a double acting hydraulic actuator having a closed working cylinder 28A mounting a reciprocating piston 30A. The piston 30A divides an interior volume of the working cylinder 28A into an upper or first fluid chamber 32A and a lower or second fluid chamber 34A. A piston rod 36A is connected at its inner end to the piston 30A and includes a mounting bracket 38A at its outer end which receives an arm 20A of the stabilizer bar 12. A second mounting bracket 40A is provided at the lower end of the working cylinder 28A to mount the hydraulic actuator 24A onto a suspension member, which is illustrated as control arm 22A.

A pump 42 draws hydraulic fluid from a reservoir 44 through a feed line 46 to supply the system 10. The pump 42 supplies an accumulator 48, preferably through a restriction 50 to attenuate noise and even fluid flow demands on the system 10. From the accumulator 48, fluid flows via a supply line 52 branch 52A through a backflow check valve 54 to a pressure-controlled conduit 56. Conduit 56 is connected to the upper chamber 32A of actuator 24A and the lower chamber 34B of actuator 24B. The supply line 52 and branch 52B deliver fluid through a backflow check valve 60 to a pressure-controlled conduit 62 connected to the upper chamber 34B of actuator 24B and the lower chamber 34A of actuator 24A.

A pressure control valve 64, preferably an electromechanical valve such as a continuously variable solenoid valve, is connected by line 66 between conduit 56 and a return line 68 which directs fluid back to the reservoir 44. In a similar manner, a pressure control valve 70, preferably a continuously variable solenoid valve, is connected by line 72 between conduit 62 and return lines 68 and 68A. Valves 64 and 70 are electrically connected to and controlled by a controller 74, preferably an electronic control unit. Valves 64 and 70 regulate pressure in respective conduits 56 and 62 in response to signals from the controller 74, thereby regulating fluid pressure in the chambers 32A,32B and 34A,34B of the hydraulic actuators 24A,24B.

In operation, a road input delivered to actuator 24A through control arm 22A will cause arm 20A to rotate. This rotation is resisted by arm 20B in a well-known manner. The present system 10 augments the stabilizer bar 12 to provide a means of increasing or decreasing roll damping or reducing roll gain. To increase roll damping, pressure in either conduit 56 or 62 is increased, thereby increasing fluid pressure in the corresponding fluid chambers. For example, if a vehicular body were rolling toward wheel 26B to the right of FIG. 1, arm 20A would move upwardly causing piston 30A to move upwardly and reduce chamber 32A. Simultaneously, arm 20B would cause piston 30B to move downwardly, reducing chamber 34B. By increasing fluid pressure in conduit 56, via control valve 64, the movements of pistons 30A,30B are resisted or reversed due to increased pressure in the chambers of the actuators 24A,24B. When no roll control is desired, pressure control valves 64 and 70 regulate a small pressure drop to maintain equal forces so that wheel motions are not transmitted to the stabilizer bar 12. If roll damping is required, the valves 64 and 70 regulate a lower pressure drop such that motions of the actuators 24A,24B are allowed but damped during the wheel motions.

The controller 74 preferably includes an algorithm to establish output current to the control valves 64 and 70 based on predetermined inputs, including lateral body acceleration indicated at 76. Various other inputs, including steering position and/or velocity 78, vehicle speed, throttle position and brake pressure can be received by the controller 74 to establish desired output currents.

Figure 3:
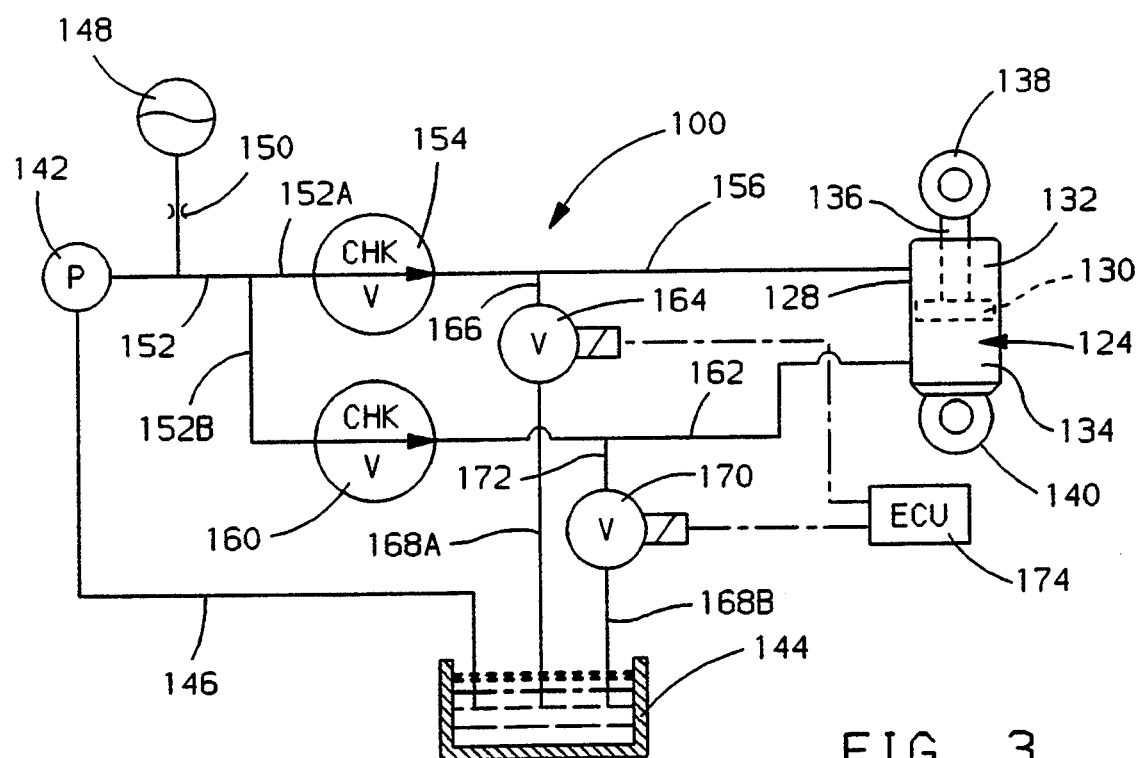
FIG. 3 is a schematic representation of a second embodiment of the present stabilizer bar system incorporating a single hydraulic actuator connected between one end of the stabilizer bar and a control arm.

A second embodiment of the present invention is illustrated schematically as system 100 in FIG. 3. Elements of system 100 which correspond to elements of system 10 are referenced with similar numerals in the 100 series.

In system 100, a single hydraulic actuator 124 is connected to one end of the stabilizer bar not illustrated at mounting bracket 138. A lower mounting bracket 140 secures the actuator 124 to a control arm (not illustrated). The opposite end of the stabilizer bar is connected to a control arm with a well-known link not illustrated. A pump 142 draws fluid from a reservoir 144 through feed line 146 to supply the system 100. Preferably, an accumulator 148 and restriction 150 are provided in a supply line 152 having branches 152A and 152B. Fluid in branch 152A travels through a first check valve 154 to a pressure-controlled conduit 156 which is in communication with an upper chamber 132 of the actuator 124. Fluid in branch 152B travels through a second check valve 160 to a pressure controlled conduit 162 which is in communication with a lower chamber 134 of the actuator 124. A first pressure control valve 164 is tied to conduit 156 by line 166 and connected to a return line 168A. A second pressure control valve 170 is tied to conduit 162 by line 172 and connected to a return line 168B. Valves 162 and 170 are connected to a controller 174.

In operation, control valve 162 varies fluid pressure in conduit 156 and upper chamber 132 to selectively resist or enhance the upward movement of the piston 130 as upper chamber 132 decreases. Control valve 164 varies fluid pressure in conduit 162 and lower chamber 134 to selectively resist or enhance the downward movement of the piston 130. In this manner, the system 100 augments the roll resistance provided by the stabilizer bar.

Figure 4:
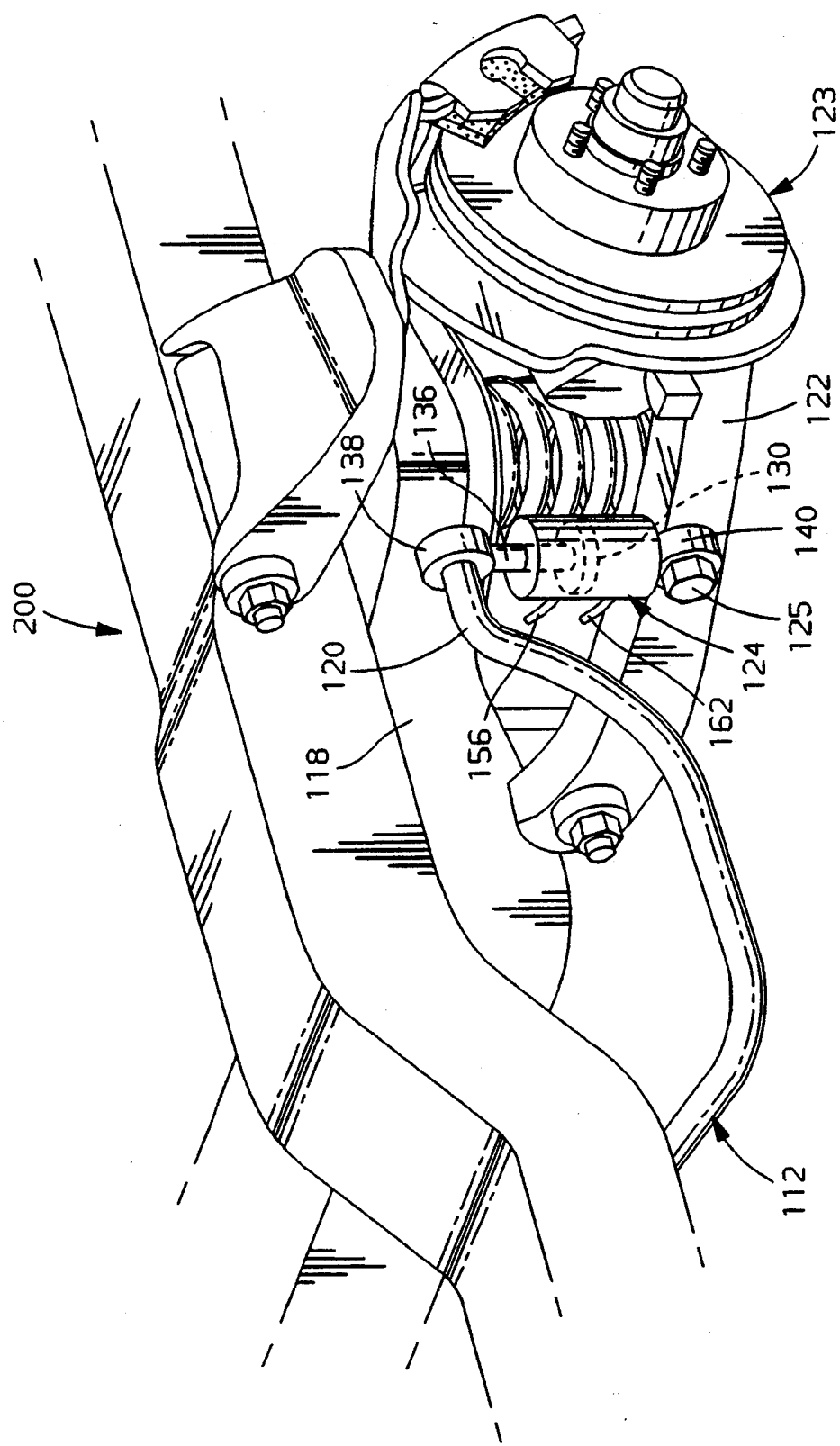
FIG. 4 is a detailed perspective view of a particular vehicular suspension system illustrating the hydraulic actuator of FIG. 3 connected between a stabilizer bar and a lower control arm.

FIG. 4 illustrates a partial suspension system 200 incorporating the system 100 of FIG. 3. A lower control arm 122 is pivotally mounted to a rail chassis 118. A spindle and hub assembly 123 is mounted on the outboard end of the control arm 122 and receives a wheel assembly not illustrated. A hydraulic actuator 124 receives an end 120 of the stabilizer bar 112 and is mounted on the control arm 122 by a fastener 125 threaded to the control arm 122.

Although the present invention has been described with reference to a preferred embodiment, workers skilled in the art will recognize that changes may be made in form and detail without departing from the spirit and scope of the invention.

The embodiments of the invention in which an exclusive property or privilege is claimed are defined as follows:

1. In a motor vehicle, a stabilizer bar system comprising:
   (a) a stabilizer bar having a first end located at a first side of the vehicle and a second end located at a second side of the vehicle;
   (b) a first hydraulic actuator having a first reciprocating piston rod connected to the first end of the stabilizer bar and a first closed working cylinder connected to a first lower suspension member, the first closed working cylinder including a first piston dividing a first interior volume of the first working cylinder into first upper and first lower fluid chambers;
   (c) a hydraulic pump having an intake connected to a fluid reservoir;
   (d) a first hydraulic line connected to an outlet of the hydraulic pump;
   (e) first and second check valves connected to the first hydraulic line;
   (f) a first pressure control line connected to the first check valve, the first upper fluid chamber and a first controllable pressure control valve;
   (g) a second pressure control line connected tot he second check valve, the first lower fluid chamber and a second controllable pressure control valve;
   (h) a second hydraulic line connected to the first pressure control valve and the reservoir;
   (i) a third hydraulic line connected to the second pressure control valve and the reservoir, wherein pressure in the first pressure control lien regulates pressure in the first upper fluid chamber and is responsive to the first controllable pressure control valve and wherein pressure in the second pressure control line regulates pressure in the first lower fluid chamber and is responsive to the second controllable pressure control valve.

2. The stabilizer bar system of claim 1, also comprising:

(j) a second hydraulic actuator having a second reciprocating piston rod connected to the second end of the stabilizer bar and a second closed working cylinder connected to a second lower suspension member, the second closed working cylinder including a second piston dividing a second interior volume of the second working cylinder into second upper and second lower fluid chambers, wherein the first pressure control line is also connected to the second lower fluid chamber and wherein the second pressure control line is also connected to the second upper fluid chamber, wherein an increase in pressure in the first upper fluid chamber corresponds to an increase in pressure in the second lower fluid chamber and wherein an increase in pressure in the second upper fluid chamber corresponds to an increase in pressure in the first lower fluid chamber, wherein vehicle roll is resisted or damped.

* * * * *